(12) United States Patent
Li et al.

(10) Patent No.: US 9,077,454 B2
(45) Date of Patent: Jul. 7, 2015

(54) OPTICAL DETECTOR FOR DETECTING OPTICAL SIGNAL BEAMS, METHOD TO DETECT OPTICAL SIGNALS, AND USE OF AN OPTICAL DETECTOR TO DETECT OPTICAL SIGNALS

(75) Inventors: Jingshi Li, Karlsruhe (DE); Matthias Lauermann, Neuenstein (DE); Sven Schüle, Weingarten (DE); Juerg Leuthold, Walzbachtal (DE); Wolfgang Freude, Karlsruhe (DE)

(73) Assignee: KARLSRUHER INSTITUT FUR TECHNOLOGIE, Karlsruhe (DE)

( * ) Notice: Subject to any disclaimer, the term of this patent is extended or adjusted under 35 U.S.C. 154(b) by 591 days.

(21) Appl. No.: 13/412,550

(22) Filed: Mar. 5, 2012

(65) Prior Publication Data

US 2012/0224184 A1 Sep. 6, 2012

(30) Foreign Application Priority Data

Mar. 4, 2011 (EP) .................................... 11001826
Sep. 2, 2011 (EP) .................................... 11007144

(51) Int. Cl.
*H04B 10/61* (2013.01)
*H04B 10/60* (2013.01)
*H04B 10/67* (2013.01)

(52) U.S. Cl.
CPC ............ *H04B 10/613* (2013.01); *H04B 10/614* (2013.01); *H04B 10/60* (2013.01); *H04B 10/61* (2013.01); *H04B 10/677* (2013.01)

(58) Field of Classification Search
CPC ... H04B 10/613; H04B 10/614; H04B 10/677

USPC .................................................. 398/205, 207
See application file for complete search history.

(56) References Cited

U.S. PATENT DOCUMENTS

| | | | |
|---|---|---|---|
| 5,003,625 A * | 3/1991 | Khoe ............................ | 398/204 |
| 2009/0103921 A1* | 4/2009 | Frankel .......................... | 398/65 |
| 2009/0196610 A1 | 8/2009 | Isomura et al. | |
| 2009/0324224 A1 | 12/2009 | Xie | |
| 2010/0245837 A1 | 9/2010 | Yamamoto | |
| 2011/0249976 A1* | 10/2011 | Osawa et al. .................. | 398/135 |

FOREIGN PATENT DOCUMENTS

| EP | 1835640 A2 * | 9/2007 | ........... H04B 10/135 |
|---|---|---|---|
| EP | 2 273 703 | 1/2011 | |

* cited by examiner

*Primary Examiner* — Leslie Pascal
(74) *Attorney, Agent, or Firm* — McDermott Will & Emery LLP

(57) ABSTRACT

An optical detector for detecting an optical signal beam (OSB) modulated in a way that it includes an in-phase and/or a quadrature component, includes: a polarization beam splitter arranged to split the OSB into two polarized OSBs; a non-polarization beam splitter arranged to further split each of the two polarized OSBs into two split polarized OSBs; at least one birefringent element providing a phase shift, the birefringent element being arranged in a path of at least one polarized OSB and/or in a path of at least one split polarized OSB so that an in-phase and quadrature phase offset between two split polarized OSBs originating from the same polarized OSB is formed in output signal beams; and at least two detection means arranged to receive at least one output signal beam that includes a in-phase and/or quadrature component of the OSB.

18 Claims, 8 Drawing Sheets

OPTICAL DETECTOR FOR DETECTING OPTICAL SIGNAL BEAMS, METHOD TO DETECT OPTICAL SIGNALS, AND USE OF AN OPTICAL DETECTOR TO DETECT OPTICAL SIGNALS

The invention relates to an optical detector for detecting optical signal beams, a method to detect optical signals, and the use of an optical detector to detect optical signals.

In the field of optical communications optical signals are modulated in their phase, amplitude and polarisation to enable them to carry a maximum of information within the signal. Optical detectors are used to demodulate the optical signal and either read out the information carried by the optical signal or couple the demodulated signals out for further processing.

In optical communications this is typically solved by either using so-called coherent detectors comprising a number of optical hybrids, or by using self-coherent detectors comprising delay interferometers, or by using delay interferometer detectors for decoding differentially encoded signals.

One such detector that is known as state of the art is shown in FIG. 9. The detector shown in FIG. 9 uses the so-called polarisation diverse coherent detection scheme. An optical signal beam 101 and a local oscillator (LO) signal beam 102 are split by two polarisation beam splitters 103 and 104 into two orthogonal states of polarisation. Each of the signals is then fed into a separate optical 90° hybrid 105 and 105'. The 90° hybrid has traditionally been constructed using two 50/50 beam splitters, two beam combiners, and one 90° phase shifter. In the optical hybrid 105, 105' the beams split of the optical signal beam and the local oscillator signal beam interfere constructively and destructively. Eight photo-diodes receive the split signal beams with their corresponding in-phase and quadrature components I and Q.

Another known detector is shown in FIG. 10. The detector shown in FIG. 10 uses the so called self-coherent detection scheme, which allows to determine the phase and amplitude of an optical beam. In a polarisation setup it also allows to determine the polarisation state. For a self-coherent detection scheme no local oscillator is needed to provide the local oscillator signal. Similar to the coherent detection, the polarisation diversity of the self coherent detection can be achieved by splitting the input signal 201 into the two orthogonal polarisations by means of a polarisation beam splitter (PBS) 202. Each polarisation is then fed into a separate self coherent IQ demodulator 203, 203'. A self coherent IQ demodulator consists of two delay interferometers which have an orthogonal phase offset between each other. With the detector shown in FIG. 10 a polarisation diverse detection can be performed where the complete field of the incoming signal 201 is recovered. This optical front end can also be used as a differential detection for a (differential) quadrature phase-shift keying signal (D)QPSK.

It is an object of the invention to provide an alternative and improved optical detector to demodulate an optical signal.

The achievement of this object in accordance with the invention is set out in the independent claims. Further developments of the invention are the subject matter of the dependent claims.

According to one aspect of the invention, an optical detector is enabled to detect an optical signal beam that is modulated in a way that it comprises an in-phase and/or a quadrature component. The optical detector comprises a polarisation beam splitter arranged to split the optical signal beam into two polarised optical signal beams and a non-polarisation beam splitter arranged to further split each of the two polarised optical signals into two split polarised optical signal beams. All split polarised optical signal beams contain signal parts originating from the optical signal beam, and especially from the polarised optical signal beams. The non-polarisation beam splitter is usually a 50/50 splitter, that splits the incoming light in two more or less equal halves without respect to the polarisation.

Detection means are arranged to receive output signal beams. At least one birefringent element providing a phase shift is arranged in at least one path of a polarised optical signal beam and/or split polarised optical signal beam that originates from the optical signal beam. The birefringent element forms an in-phase and quadrature phase offset between two split polarised optical signal beams in a way that the in-phase and quadrature components of the optical signal beam can be detected by the detection means. The birefringent element can be an untuneable birefringent element or a tuneable birefringent element. For instance it can be implemented as a wave plate or as liquid crystal. The phase shift that the birefringent element provides is an attribute of the birefringent element. Optical beams comprising a wavelength that corresponds to the optical activity of the birefringent element will experience a birefringence according to the phase shift the element provides.

An optical detector according to the invention can detect the phase, the polarisation state and the amplitude of an optical signal while only comprising a small number of optical elements. By arranging the birefringent element and the polarisation beam splitter according to the invention the number of optical elements needed for the detector can be reduced which is a financial and an assembly advantage during the production.

The optical detector detects the optical signal beam by demodulating it in its components, and then receiving some or all of its components by the detection means. A fully modulated signal in the c-band applications at 1550 nm (40 Gbps) for example comprises eight signal components, so eight detectors to detect all its components work best. The detector can also be tuned to receive signals at wavelengths between 800 nm to 2000 nm, for example I-band signals at 1300 nm.

By arranging the birefringent element in the path of the beams splits, an orthogonality between the in-phase and quadrature phase components of the beams are guaranteed. Therefore no active control is needed during the detection.

The polarisation beam splitters (PBS) might be implemented as cube PBS, plate PBS, grating couplers with metalized and/or dielectric coatings. Other implementations may be used by those skilled in the art.

The optical signal beam can be coupled into the optical detector by a grin lens fiber pigtail, and/or a lens fiber, and/or a grating coupler, and/or any other means.

The detection means can either be photo-diodes, means to decouple the beam splits into optical fibers, and/or means to map out the beam splits like mirrors and/or lenses.

In a further development of the invention, the birefringent element is arranged to form the in-phase and quadrature offset according to the coherent, the self-coherent, or the differential detection principle. Depending on the phase shift provided by the birefringent element, the optical detector can either be used as a coherent detector, as a self-coherent detector, or as a differential detector. Exchanging the birefringent element or tuning it to a different phase shift influences the optical detector in a way that it can be used as either of these detectors. The design allows an adaption of the delay interferometer arm lengths to the symbol duration in order to optimise the reception of the signals. The symbol duration is the pulse width in time, e.g. for a 40 GBd signal, one symbol duration equals 25 ps. The design further serves as a platform for an universal detector that may be used either as coherent, self-coherent or differential detector. The birefringent elements are tuneable by adjusting means that control their phase shift. By adjusting the phase shift of the birefringent element to be e.g. either a quarter wave plate or a half wave plate, the detector can be used as either a coherent or self-coherent detector.

Advantageously, the optical axis of the birefringent element is arranged at a fixed angle with respect to the optical axis of the polarisation beam splitter. Is the birefringent element working as a quarter wave plate, it can convert a linear polarised beam into circular polarisation. The birefringent element is used to equally separate the beam transversing it into the horizontal and vertical polarisations. Is the birefringent element working as a half wave plate it basically flips the polarisation of the polarised beam. Depending on the embodiment of the invention, the birefringent element can e.g. be arranged at an angle of 45° or 0° with respect to the optical axis of the polarisation. If it is e.g. arranged at an angle of 22.5° and implemented as a half wave plate, it can convert a linear polarisation at 0°/90° of a passing beam into a 45°/−45° linear polarisation.

In some setups according to an embodiment of the invention one birefringent element is arranged in the detector having the function of a half wave plate, and another one having the function of a quarter wave plate. Both are advantageously arranged at a fixed angle with respect to the optical axis of the polarisation beam splitter, e.g. 45°. A further birefringent element may be used to mitigate any polarisation dependent phase shift which in practical cases might exist.

The birefringent element can be arranged in both polarised optical signal beams split off the optical signal beam by the polarisation beam splitter. Depending on the design of the detector, it can be arranged before or after the beams pass the non-polarisation beam splitter.

In a further development of the detector, a local oscillator signal beam is provided by a local oscillator. The local oscillator signal beam (LO) is used for the coherent detection. The input for the local oscillator signal can for example be a grin lens fiber pigtail, and/or a lens fiber a grating coupler and/or any other means to couple the local oscillator signal into the system.

In the detector that comprises a local oscillator, a polarisation beam splitter can be arranged to split the local oscillator signal beam into two polarised local oscillator signal beams. The polarised local oscillator signal beams are then guided inside the detector to interfere with the beams originating from the optical signal beam. The non-polarisation beam splitter can be arranged to further split the two polarised local oscillator signal beams. By using a reflector or other means to guide the polarised LO signal beams into the same non-polarisation beam splitter that also splits the polarised optical signal beams, only a single non-polarisation beam splitter is needed for the whole optical detector. It is one idea of the optical detector according to an embodiment of the invention to reuse as many optical elements as possible to reduce their total number.

The reflectors can be implemented as mirrors, and/or as corner cubes, and/or as porro prisms, and/or as retro-reflectors. Other implementations with metallic and/or dielectric coatings might be also used as reflectors.

A further birefringent element can be arranged in the detector to adjust phase errors between beam splits. This birefringent element is advantageously tuneable, so that the detector can be adjusted by tuning the birefringent element. Phase errors can occur by different imperfections of the optical elements of the detector.

The optical detector can comprise reflectors to reflect beams comprising parts of the signal back to the non-polarisation beam splitter. In an optimised setup of the optical detector only a single non-polarisation beam splitter is needed to provide the full functionality of providing self-coherent, coherent and a differential detection of the signal beam.

The optical detector can comprise tuneable and/or untuneable delay means arranged in the path of at least one split polarised optical signal beam to create a time delay between different split polarised optical signal beams. The delay means can for example be phase shifter, spacer, and/or mechanical actuators.

In a further development of the invention, the optical detector comprises at least two output ports arranged to couple out constructive and destructive interfering beams. One output port is used to couple out the constructive interfering beams, the second to couple out the destructive interfering beams. Polarisation beam splitters can be arranged to orthogonally split the beams coupled out by the output ports. In case the detector comprises means to provide a local oscillator signal beam, the constructive and destructive interfering beams coupled out of the output ports can be guided into the same polarisation beam splitters that are used to split the optical signal beam and the local oscillator signal beam in the beginning while being coupled into the detector. This reduces the number of polarisation beam splitters needed for the detector by reusing them as often as possible.

The birefringent element can be arranged as a wave plate in the path of two optical beams that share a physical path within the detector at orthogonal polarisations. While the optical beams comprise orthogonal polarisations, no interference happens. Thus, they can share the same path. An interference can be started by the phase shift of the birefringent element, or it can be used to flip the polarisations without initiating an interference. For example, the birefringent element can be a quarter wave plate or a half wave plate. The two optical beams comprising orthogonal polarisations can either be two beams originating from the optical signal beam or one beam originating from the optical signal beam and one beam originating from the local oscillator signal beam.

The optical detector can comprise guiding means arranged to guide the two polarised optical signal beams split by the polarisation beam splitter parallel but spatially separated into the non-polarisation beam splitter. Then the same non-polarisation beam splitter can be used for both polarised beams. The guiding means can be a reflector or a waveguide.

According to one aspect of the invention, a method for detecting an optical signal beam modulated that it comprises an in-phase and/or quadrature component, comprises the following steps:
  splitting the optical signal beam in two polarised optical signal beams;
  further splitting the two polarised optical signal beams into two split polarised optical signal beams;
  using a birefringent element comprising a phase shift to form an in-phase and quadrature phase offset between two split polarised optical signal beams originating from the same polarised optical signal beam to form output signal beams; and
  receiving the output signal beams that comprise the in-phase and quadrature components of the optical signal beam.

A further aspect of the invention makes use of an optical detector according to any of the claims 1 to 18 to detect an optical signal beam according to the method of claim 19.

Summarizing, among others, there is provided a versatile demodulator for receiving optical amplitude, phase and polarization modulated signals. Individual features of one or more aspects and/or individual features of one or more embodiments can be combined with each other in order to provide further aspects and/or embodiments.

In the following the invention will be described by way of example, without limitation of the general inventive concept, with the aid of embodiments with reference to the drawings to which attention is drawn concerning the disclosure of all details of the invention not described more explicitly in the text. Some features shown in the different embodiments can be exchanged into the implementations shown in another embodiment. Shown by:

Figure 1:
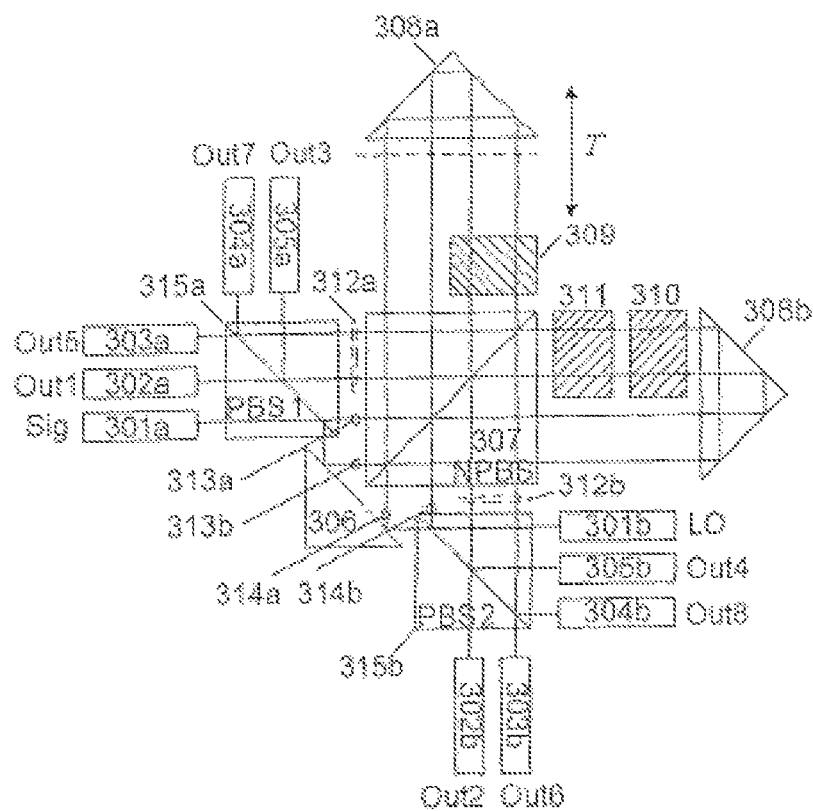
FIG. 1 is a schematic drawing of an exemplary implementation of the optical detector according to the invention.

FIG. 1 shows an optical detector according to the invention. In the optical detector an optical signal beam 301a and a local oscillator signal beam 301b are coupled in. The detector comprises a first and second polarisation beam splitter 315a and 315b, a non-polarisation beam splitter 307, the reflectors 306, 308a, and 308b and three birefringent elements 309, 310 and 311. It further comprises eight detection means 302a, 303a, 304a, 305a, 302b, 303b, 304b, and 305b to either detect the demodulated parts of the signal or to decouple them out of the detector.

By means of a grins lens fiber pigtail, a lens fiber, a grating coupler or any other means the optical signal/optical signal beam 301a is coupled into the detector. The first polarisation beam splitter 315a comprising an optical axis at an angle of 45° to the propagation direction of the optical signal 301a is arranged in the path of the optical signal beam 301a. The incoming optical signal beam 301a is split by the first polarisation beam splitter 315a in two orthogonally (x and y) polarised beams of the optical signal beam. The first polarisation beam splitter 315a is arranged in a way that one polarised beam of the optical signal (one polarised optical signal beam) keeps its direction of propagation (here the polarised optical signal beam 313a which is polarised in x-direction), the other beam (the polarised optical signal beam 313b which is polarised in y-direction) is guided into a direction comprising an angle of 90° to the direction of propagation of the original optical signal beam 301a.

A local oscillator couples the local oscillator signal beam (LO) 301b in the detector. The local oscillator beam can be part of the optical detector or it can be an external oscillator providing the local oscillator signal beam 301b. The local oscillator signal beam 301b coupled into the detector is propagating in the direction opposite to the direction of propagation of the optical signal beam 301a.

A fixed relation between the direction of propagation of the LO signal beam 301b and the optical signal beam 301a enables reusing the optical elements in the detector. Especially angles of 0°, 90°, and 180° between the two input signal beams are preferred.

The second polarisation beam splitter 315b is arranged in the path of the local oscillator signal beam 301b, its optical axis being arranged at an angle of 45° to the direction of propagation of the local oscillator signal beam 301b. The second polarisation beam splitter 315b splits the local oscillator signal beam 301b into two orthogonally polarised beams. One polarised beam split off the local oscillator signal (here the x-polarised light beam 314a) keeps its direction of progression while transversing the second polarisation beam splitter 315b, the other polarised beam (here the y-polarised light beam 314b) is reflected by the second polarisation beam splitter 315b in an angle of 90° to the direction of propagation of the local oscillator signal beam 301b.

The reflector 306 is arranged so that its reflecting side is parallel to the two optical axes of the first and second polarisation beam splitter 315a and 315b. It is arranged in a way that it reflects the polarised beam 313b of the optical signal beam and the polarised beam 314a of the local oscillator signal beam under an angle of 90° so that the two polarised beams 313a and 313b of the optical signal beams are progressing parallel to each other, and also the two polarised beams 314a and 314b of the local oscillator signal beam are progressing parallel to each other. The reflector 306 is needed to guide all four polarised beams 313a, 313b, 314a, and 314b towards the non-polarisation beam splitter 307. The non-polarisation beam splitter 307 might be a cube, a plate, a directional coupler, or an asymptotic waveguide coupler in various material systems.

The non-polarisation beam splitter 307 is arranged in the detector so that all four polarised beams (313a and 313b originating from the optical signal beam 301a and 314a and 314b originating from the local oscillator signal beam 301b) hit the optical axis of the polarisation beam splitter 307 in only two different spots at an angle of 45°. At the non-polarisation beam splitter 307 the four polarised beams 313a, 313b, 314a, and 314b are combined in two physical areas where they are split up into four beams, each beam carrying signals with orthogonal polarisations. No interference of the beams originating from the optical signal beam 301a and the local oscillator signal beam 301b happens at this point, since only orthogonal polarised beams are combined.

At the non-polarisation beam splitter 307 all incoming beams are equally split into two paths. Since one polarised beam originating from the optical signal is combined with one polarised beam originating from the local oscillator signal and the combination is equally split in half by the non-polarisation beam splitter 307, only four beams of light are coupled out of the non-polarisation beam splitter 307 at this point. Two of each are parallel to each other, so that the four beams exit the non-polarisation beam splitter 307 in two paths.

At the end of each of the two paths the reflectors 308a and 308b are arranged. Two parallel beams are reflected by 180° by the reflector 308a, the other two parallel beams are reflected by 180° by the reflector 308b. All four beams are reflected back into the non-polarisation beam splitter 307. The reflectors 308a and 308b are arranged in the detector in a way that they can reflect the polarised but not yet interfering beams emanating from the non-polarisation beam splitter 307 back towards the non-polarisation beam splitter 307.

The beams are not only reflected backwards by the reflectors 308a and 308b, but also shifted within the plain which is defined by the direction of propagation of the optical signal 301a and all its beams originating from it. This shift causes the beams to be reflected towards the non-polarisation beam splitter 307 in the direction opposite towards their direction of propagation before being reflected by the reflectors 308a, 308b, but meeting the optical axis of the non-polarisation beam splitter 307 at a different position than that at which they were split before.

At each path, one or multiple birefringent elements 309, 310, 311 are used to form the in-phase and quadrature phase offset between two paths of the beams in a coherent, self-coherent or differential detection principle.

In the upper path, for the beams reflected by the reflector 308a, a time delay T is introduced for the beams. The delay may be tuneable or fixed so that the beams may later interfere with different phase offsets and may be adapted to different symbol rates. The birefringent element 309 is arranged in the path of these two beams to produce a relative phase shift. In the self-coherent detection scheme, the birefringent element 309 distributes the signal equally onto its I and Q components (which may be for example the horizontal and the vertical polarisation). In the coherent detection scheme, while the optical detector is working as a coherent receiver, the birefringent element 309 flips the x- and y-polarisation of the transversing beams.

In the right path, for beams reflected by the reflector 308b, the two birefringent elements 310 and 311 are arranged in the path of the reflected beams propagating back towards the non-polarisation beam splitter 307.

All four beams are reflected back to the same non-polarisation beam splitter 307 that is also used as a combiner were the beams interfere. The in-phase and quadrature signals interfering constructively are mapped out onto a output port 312a and the in-phase and quadrature signals interfering destructively are mapped out onto another output port 312b. All beams transversing the output ports 312a and 312b comprise an orthogonal polarised in-phase and quadrature phase, so they can be separated by polarisation beam splitters.

The beams interfering constructively that are mapped out through the output port 312a are guided to the first polarisation beam splitter 315a. The first polarisation beam splitter 315a is arranged to separate the beams and guide them to the detection means 302a, 303a, 304a, and 305a.

The beams interfering destructively that are mapped out through the output port 312b are guided to the second polarisation beam splitter 315b. The second polarisation beam splitter 315b is arranged to separate the beams and guide them to the detection means 302b, 303b, 304b, and 305b.

The detection means 302a, 302b, 303a, 303b, 304a, 304b, 305a, and 305b receive the constructive and destructive in-phase and quadrature signals of the original optical signal beam 301a. The detector has effectively demodulated the optical signal beam 301a. The detection means 302a, 302b, 303a, 303b, 304a, 304b, 305a, and 305b may be photodiodes to detect the demodulated signal parts, or they can be means to decouple the signal parts into fibers. They can also be mirrors or lenses to map the signal parts out of the optical detector.

The optical detector comprises a Michelson like interferometer structure and allows reusing the optical components as much as possible. It may serve as polarisation diversity coherent or self-coherent or differential detector, and also as single polarisation coherent, self-coherent, differential detector or a polarisation insensitive differential phase-shift keying detector. The orthogonality between the in-phase and quadrature phase components are guaranteed by the birefringent elements. Therefore no active control is needed during the detection.

In the following the use of the optical detector according to FIG. 1 in a polarisation diversity coherent detection scheme is described.

In a polarisation diversity coherent detection scheme, both the optical signal beam 301a and the local oscillator signal beam 301b are launched into the system. The time delay T that is introduced into the path of the beams reflected by the reflector 308a is set to '0' or a small delay. In their path the birefringent element 309 has the function of a half wave plate (HWP), and the birefringent element 311 in the other path has the function of a quarter wave plate (QWP). The other birefringent element 310 may not be needed or may be tuned not to have any effect. It can be used to mitigate any polarisation dependent phase shift which in practical cases might exist.

The optical signal beam 301a and the local oscillator signal beam 301b are split by the two polarisation beam splitters 315a and 315b into two orthogonal polarisations and then led with spatially separate beams into the non-polarisation beam splitter 307 where they are equally split into two paths. The axis of the HWP 309 is at 45° off with respect to the axis of the local oscillator signal 301b and the optical signal 301a, so that it basically flips the polarisation of the signal parts that transverse it. The QWP 311 is aligned to the polarisation of either the local oscillator signal 301b or the optical signal 301a. It is needed to probe the signal 301a with an in-phase and quadrature local oscillator offset, respectively. The birefringent element 310 might be used to adjust phase errors. Additional birefringent elements might be in either path.

The beams are reflected back by the reflectors 308a and 308b onto the same non-polarisation beam splitter 307, where the beams originating from the optical signal 301a and the local oscillator signal 301b then interfere. The in-phase and quadrature signals interfering constructively are mapped onto the output port 312a, the in-phase and quadrature signals interfering destructively are mapped onto the output port 312b. The in-phase and quadrature phase of the output signal are orthogonally polarised and are subsequently separated by the polarisation beam splitters 315a and 315b. In this way the constructive in-phase and quadrature phase and the destructive in-phase and quadrature phase signals can be detected by the detection means 302a to 305b.

Thus, in a polarisation diversity scheme two optical 90° hybrids schemes (as are used in the detector shown in FIG. 9) are nested in one physical device. The principal can also be shown mathematically with the help of Jones calculus:

The signal 301a then equals $$\begin{pmatrix} S_x \\ S_y \end{pmatrix},$$

the local oscillator signal 301b $$\begin{pmatrix} L_x \\ L_y \end{pmatrix}.$$

Considering now only one path after the polarisation beam splitters 315a and/or 315b, i.e. the x-polarisation 313a of the optical signal 301a and the y-polarisation 314b of the local oscillator signal 301b, they are combined at the non-polarisation beam splitter 307 and split equally into two paths. The beam on the upper path can be written as $$\frac{j}{\sqrt{2}} \begin{pmatrix} S_x \\ L_y \end{pmatrix} =$$

$$\frac{j}{\sqrt{2}} \begin{pmatrix} 1 & 0 \\ 0 & 1 \end{pmatrix}_{NPBS} \begin{pmatrix} 1 & 0 \\ 0 & 0 \end{pmatrix}_{PBS1} \begin{pmatrix} S_x \\ S_y \end{pmatrix} + \frac{1}{\sqrt{2}} \begin{pmatrix} 1 & 0 \\ 0 & 1 \end{pmatrix}_{NPBS} \begin{pmatrix} 0 & 0 \\ 0 & j \end{pmatrix}_{PBS2} \begin{pmatrix} L_x \\ L_y \end{pmatrix}.$$

It is then reflected by the reflector 308a and passes through the rotated half wave plate 309, resulting in $$\frac{j}{\sqrt{2}} \begin{pmatrix} L_y \\ S_x \end{pmatrix} = \frac{j}{\sqrt{2}} \begin{pmatrix} 0 & 1 \\ 1 & 0 \end{pmatrix}_{HWP} \begin{pmatrix} S_x \\ L_y \end{pmatrix}.$$

The beam on the right hand side path is $$\frac{1}{\sqrt{2}} \begin{pmatrix} S_x \\ -L_y \end{pmatrix} =$$

$$\frac{1}{\sqrt{2}} \begin{pmatrix} 1 & 0 \\ 0 & 1 \end{pmatrix}_{NPBS} \begin{pmatrix} 1 & 0 \\ 0 & 0 \end{pmatrix}_{PBS1} \begin{pmatrix} S_x \\ S_y \end{pmatrix} + \frac{j}{\sqrt{2}} \begin{pmatrix} 1 & 0 \\ 0 & 1 \end{pmatrix}_{NPBS} \begin{pmatrix} 0 & 0 \\ 0 & j \end{pmatrix}_{PBS2} \begin{pmatrix} L_x \\ L_y \end{pmatrix}.$$

After the reflector 308b, the quarter wave plate 311 adds a 90° phase shift for one polarisation, e.g. the y-polarisation component 314b, so that the beam on the right hand side after the QWP 311 is $$\frac{1}{\sqrt{2}} \begin{pmatrix} S_x \\ -jL_y \end{pmatrix} = \begin{pmatrix} 1 & 0 \\ 0 & j \end{pmatrix}_{QWP} \frac{1}{\sqrt{2}} \begin{pmatrix} S_x \\ -L_y \end{pmatrix}.$$

At the splitting surface of the non-polarisation beam splitter 307 the beams of the two paths are combined again. For the outputs Out1 302a and Out3 305a, the sum of the beam at port 312a is $$\begin{pmatrix} E_{Out1} \\ E_{Out3} \end{pmatrix} = \frac{1}{2} \begin{pmatrix} S_x - L_y \\ -(S_x + jL_y) \end{pmatrix} =$$

$$\frac{1}{\sqrt{2}} \begin{pmatrix} 1 & 0 \\ 0 & 1 \end{pmatrix}_{NPBS} \frac{j}{\sqrt{2}} \begin{pmatrix} L_y \\ S_x \end{pmatrix} + \frac{1}{\sqrt{2}} \begin{pmatrix} 1 & 0 \\ 0 & 1 \end{pmatrix}_{NPBS} \frac{1}{\sqrt{2}} \begin{pmatrix} S_x \\ -jL_y \end{pmatrix}.$$

For the outputs Out2 302b and Out4 305b, the sum of the beam at port 312b is $$\begin{pmatrix} E_{Out2} \\ E_{Out4} \end{pmatrix} = \frac{j}{2} \begin{pmatrix} S_x + L_y \\ -(S_x - jL_y) \end{pmatrix} =$$

$$\frac{1}{\sqrt{2}} \begin{pmatrix} 1 & 0 \\ 0 & 1 \end{pmatrix}_{NPBS} \frac{j}{\sqrt{2}} \begin{pmatrix} L_y \\ S_x \end{pmatrix} + \frac{1}{\sqrt{2}} \begin{pmatrix} 1 & 0 \\ 0 & 1 \end{pmatrix}_{NPBS} \frac{1}{\sqrt{2}} \begin{pmatrix} S_x \\ -jL_y \end{pmatrix}.$$

Figure 9:
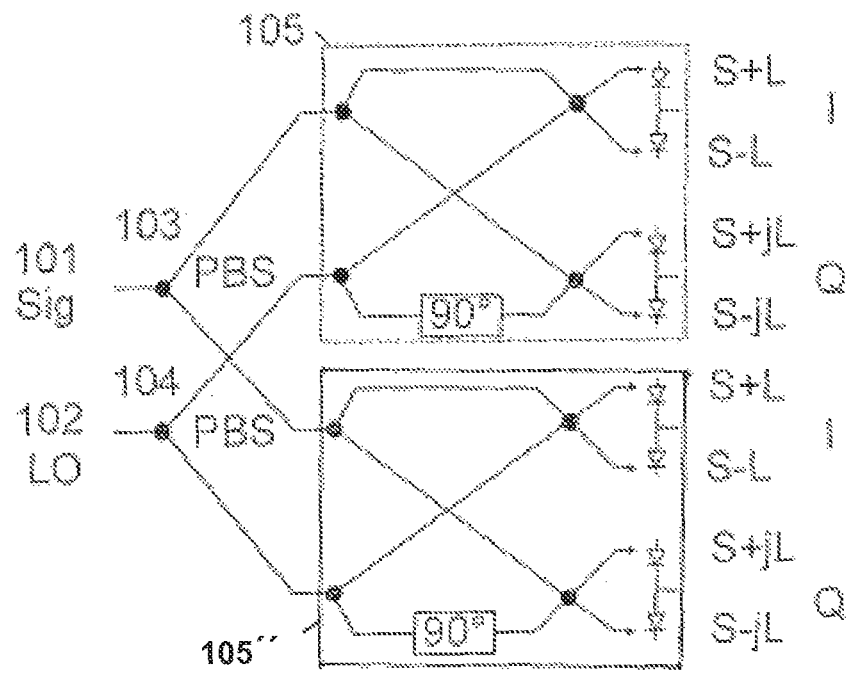
FIG. 9 is a polarisation diverse coherent detector as known by the state of the art.

At the four outputs Out1, Out2, Out3, and Out4 for one polarisation of the optical signal 301a the summation with the local oscillator signal 301b yields the typical relations for a 90° optical hybrid as depicted in FIG. 9, S+L and S−L for the in-phase component, and S+jL and S−jL for the quadrature component of one signal.

The relation for the other input signal polarisations 313b and 314a can be deduced in the same way, the resulting field at the outputs Out5 303a and Out7 304a as well as outputs Out6 303b and Out8 304b are given by $$\begin{pmatrix} E_{Out5} \\ E_{Out7} \end{pmatrix} = \frac{1}{2} \begin{pmatrix} S_y - L_x \\ -j(S_y + jL_x) \end{pmatrix}, \begin{pmatrix} E_{Out6} \\ E_{Out8} \end{pmatrix} = \frac{1}{2} \begin{pmatrix} -j(S_y + L_x) \\ S_y + jL_x \end{pmatrix}$$

In the following the use of the optical detector according to FIG. 1 in a polarisation diversity self-coherent detection scheme is described.

The scheme of the self-coherent detection design is almost the same as the coherent detection except for different birefringent elements 309, 310, and 311, the non-'0' path difference after the non-polarisation beam splitter 307 and the unnecessary local oscillator signal 301b.

The optical signal beam 301a is split at the polarisation beam splitter 315a and then both polarisations are further split at the non-polarisation beam splitter 307. After the non-polarisation beam splitter 307, on each path there is a birefringent element 309 and 310 that is a first quarter wave plate QWP1. The axes of both quarter wave plates 309 and 310 are at a 45° angle with respect to the optical axis of the polarisation beam splitter 315a, so that they convert the linear polarisations (x and y) of the beams split by the polarisation beam splitter 315a into circular polarisations. Therefore in the same spatial beam the power of the horizontal polarised and the vertical polarised components with respect to the polarisation beam splitter 315a have the same power. Other birefringent elements can be used instead of the QWP 309 and 310 as long as the power of the horizontal polarisation and the vertical polarisation are equal after transversing the birefringent element.

In order to probe the optical signal with its in-phase and quadrature phase delayed copy, the birefringent element 311 is arranged into one path as a second quarter wave plate QWP2 with a 0° angle with respect to the optical axis of the polarisation beam splitter 315a to create a relative 90° phase shift between the two polarisations in the same spatial beam.

In one path the beams receive a time delay T, so that the two paths have a relative time delay T between each other. The beams are then combined at the non-polarisation beam splitter 307 to yield the interference of the delayed and undelayed beams. The beams are then guided towards the polarisation beam splitters 315a and 315b at the outputs to separate the two polarisations to get the I and Q components of each polarisation state (x and y) of the input signal 301a. Thus, the I and Q phase offset are fixed by the birefringent elements and the four logic delay interferometers of FIG. 10 (I and Q for each of the two polarisations x and y) are fold into one single delay interferometer and share the same delay T. For the calculation, the phase shift at the components is assumed to be ideal. Possible imperfections of the real elements can be compensated by means of the birefringent elements 309, 310, and 311.

The principle can also be shown with Jones calculus. Assuming the optical elements of the optical detector shown in FIG. 1 to be ideal, the optical signal 301a at the input comprises two orthogonal polarisations, that are split in the first polarisation beam splitter 315a. The calculation here follows the x polarisation 313a as input for the non-polarisation beam splitter 307. The optical field of the beam after the polarisation beam splitter 315a is $$\begin{pmatrix} E_x(t) \\ 0 \end{pmatrix} = \begin{pmatrix} 1 & 0 \\ 0 & 0 \end{pmatrix}_{PBS1} \begin{pmatrix} E_x(t) \\ E_y(t) \end{pmatrix}_{In}.$$

At the non-polarisation beam splitter 307 the beams are split into two paths, the upper path getting reflected by the reflector 308a and receiving a 90° relative phase shift and a time delay T.

$$\frac{j}{\sqrt{2}} \begin{pmatrix} E_x(t-T) \\ 0 \end{pmatrix} = \begin{pmatrix} \delta(t-T) & 0 \\ 0 & \delta(t-T) \end{pmatrix}_{delay} \times \left[ \frac{j}{\sqrt{2}} \begin{pmatrix} 1 & 0 \\ 0 & 1 \end{pmatrix}_{NPBS} \begin{pmatrix} E_x(t) \\ 0 \end{pmatrix} \right]$$

The phase shift can be introduced by adding a small time delay to T. The phase shift can however be introduced by a tuneable birefringent element and/or other means. Subsequently, the beam hits the quarter wave plate QWP1 309 under an 45° angle. The field after the quarter wave plate 309 is $$\frac{E_x(t-T)}{2\sqrt{2}} \begin{pmatrix} -1+j \\ 1+j \end{pmatrix} = \frac{1}{2} \begin{pmatrix} 1+j & 1-j \\ 1-j & 1+j \end{pmatrix}_{QWP1} \frac{j}{\sqrt{2}} \begin{pmatrix} E_x(t-T) \\ 0 \end{pmatrix}.$$

The second beam reflected by the reflector 308b also transverses a quarter wave plate 310 under an angle of 45°. After passing through this element it can be described by $$\frac{E_x(t)}{2\sqrt{2}} \begin{pmatrix} 1+j \\ 1-j \end{pmatrix} = \frac{1}{2} \begin{pmatrix} 1+j & 1-j \\ 1-j & 1+j \end{pmatrix}_{QWP1} \frac{1}{\sqrt{2}} \begin{pmatrix} 1 & 0 \\ 0 & 1 \end{pmatrix}_{NPBS} \begin{pmatrix} E_x(t) \\ 0 \end{pmatrix}.$$

After sending the second beam through the quarter wave plate QWP2 311 aligned with 0° towards the polarisation beam splitter 315a the beam can be described by $$\frac{E_x(t)}{2\sqrt{2}} \begin{pmatrix} 1+j \\ 1+j \end{pmatrix} = \begin{pmatrix} 1 & 0 \\ 0 & j \end{pmatrix}_{QWP2} \frac{E_x(t)}{2\sqrt{2}} \begin{pmatrix} 1+j \\ 1-j \end{pmatrix}.$$

At the non-polarisation beam splitter 307 the beams from the two paths are interfering with each other, the reflected path in the non-polarisation beam splitter 307 having a relative phase shift of 90°, resulting in the four output beams. Two of which are 302a and 305a at the polarisation beam splitter 315a:

$$\begin{pmatrix} E_{Out1}(t) \\ E_{Out3}(t) \end{pmatrix} =$$

$$\begin{pmatrix} E_{XI}(t) \\ E_{XQ}(t) \end{pmatrix} = \frac{1}{\sqrt{2}} \begin{pmatrix} 1 & 0 \\ 0 & 1 \end{pmatrix}_{NPBS} \frac{E_x(t)}{2\sqrt{2}} \begin{pmatrix} 1+j \\ 1+j \end{pmatrix} + \frac{j}{\sqrt{2}} \begin{pmatrix} 1 & 0 \\ 0 & 1 \end{pmatrix}_{NPBS}$$

$$\frac{E_x(t-T)}{2\sqrt{2}} \begin{pmatrix} -1+j \\ 1+j \end{pmatrix} = = \frac{1}{2\sqrt{2}} \left[ \begin{pmatrix} E_x(t) \\ E_x(t) \end{pmatrix} + \begin{pmatrix} -E_x(t-T) \\ jE_x(t-T) \end{pmatrix} \right] e^{j45°}$$

Two more signals are mapped out to outputs 302b and 305b at the polarisation beam splitter 315b:

$$\begin{pmatrix} E_{Out2}(t) \\ E_{Out4}(t) \end{pmatrix} =$$

$$\begin{pmatrix} E_{XI}(t) \\ E_{XQ}(t) \end{pmatrix} = \frac{1}{\sqrt{2}} \begin{pmatrix} 1 & 0 \\ 0 & 1 \end{pmatrix}_{NPBS} \frac{E_x(t)}{2\sqrt{2}} \begin{pmatrix} 1+j \\ 1+j \end{pmatrix} + \frac{1}{\sqrt{2}} \begin{pmatrix} 1 & 0 \\ 0 & 1 \end{pmatrix}_{NPBS}$$

$$\frac{E_x(t-T)}{2\sqrt{2}} \begin{pmatrix} -1+j \\ 1+j \end{pmatrix} = = \frac{1}{2\sqrt{2}} \left[ \begin{pmatrix} E_x(t) \\ E_x(t) \end{pmatrix} + \begin{pmatrix} -E_x(t-T) \\ jE_x(t-T) \end{pmatrix} \right] e^{j135°}$$

With the adjustment of the phase shifts between the two paths, the outputs Out1 302a and Out2 302b carry the in-phase component of the x-polarisation. They correspond to $E_{XT1}(t)$ and $E_{XT2}(t)$, which are balanced outputs with a relative phase difference of 180°. The outputs Out3 305a and Out4 305b correspond to $E_{XQ1}(t)$ and $E_{XQ2}(t)$ which are balanced outputs with a 180° phase difference between each other. But in respect to the outputs Out1 302a and Out2 302b they have a phase shift of 90°, so that this balanced output carries the quadrature component of the incoming signal $E_X(t)$.

The shown derivation applied on the second path after the polarisation beam splitter 315a with the y-polarisation component $E_Y(t)$ 313b results in the outputs 303a, 304a, 303b, and 304b:

$$\begin{pmatrix} E_{Out5}(t) \\ E_{Out7}(t) \end{pmatrix} = \begin{pmatrix} E_{YI}(t) \\ E_{YQ}(t) \end{pmatrix} = \frac{j}{2\sqrt{2}} \left[ \begin{pmatrix} E_Y(t) \\ E_Y(t) \end{pmatrix} + \begin{pmatrix} -E_Y(t-T) \\ -jE_Y(t-T) \end{pmatrix} \right] e^{j45°}$$

$$\begin{pmatrix} E_{Out6}(t) \\ E_{Out8}(t) \end{pmatrix} = \begin{pmatrix} E_{YI}(t) \\ E_{YQ}(t) \end{pmatrix} = \frac{j}{2\sqrt{2}} \left[ \begin{pmatrix} E_Y(t) \\ E_Y(t) \end{pmatrix} + \begin{pmatrix} E_Y(t-T) \\ jE_Y(t-T) \end{pmatrix} \right] e^{j135°}$$

Herein $E_{YT1}(t)$ and $E_{YT2}(t)$ correspond to the outputs Out5 303a and Out6 303b, carrying the in-phase component of the incoming y-polarisation signal while $E_{YQ1}(t)$ and $E_{YQ2}(t)$ correspond to the outputs Out7 304a and Out8 304b with the quadrature component of the signal.

Figure 10:
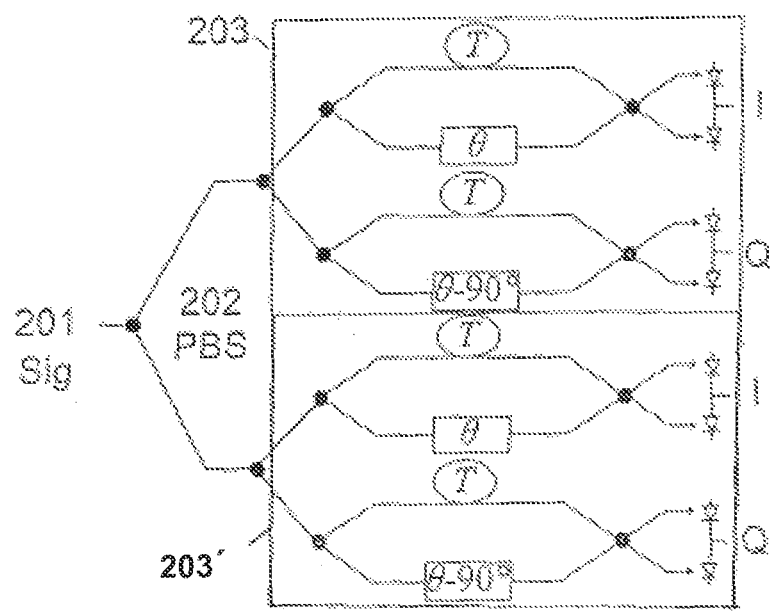
FIG. 10 is a polarisation diverse self-coherent detector as known by the state of the art.

Thus the I- and Q-delay interferometer pair as known from FIG. 10 are combined into one single delay interferometer by using wave plates that share the same physical path however at orthogonal polarisations. Further the delay interferometers for the two orthogonal components of the incoming signal 301a are combined into the same delay interferometer by folding them in parallel with each other and spatially separating the outputs.

The optical detector in FIG. 1 can be used as a polarisation diverse self-coherent detector that may also be used as a polarisation diverse (differential) quadrature phase-shift keying differential detector comprising only one non-polarisation beam splitter 307, two polarisation beam splitter 315a and 315b, three quarter wave plates (two at 45° and one at 0°) 309, 310, and 311, and three reflectors 306, 308a, and 308b.

Figure 2:
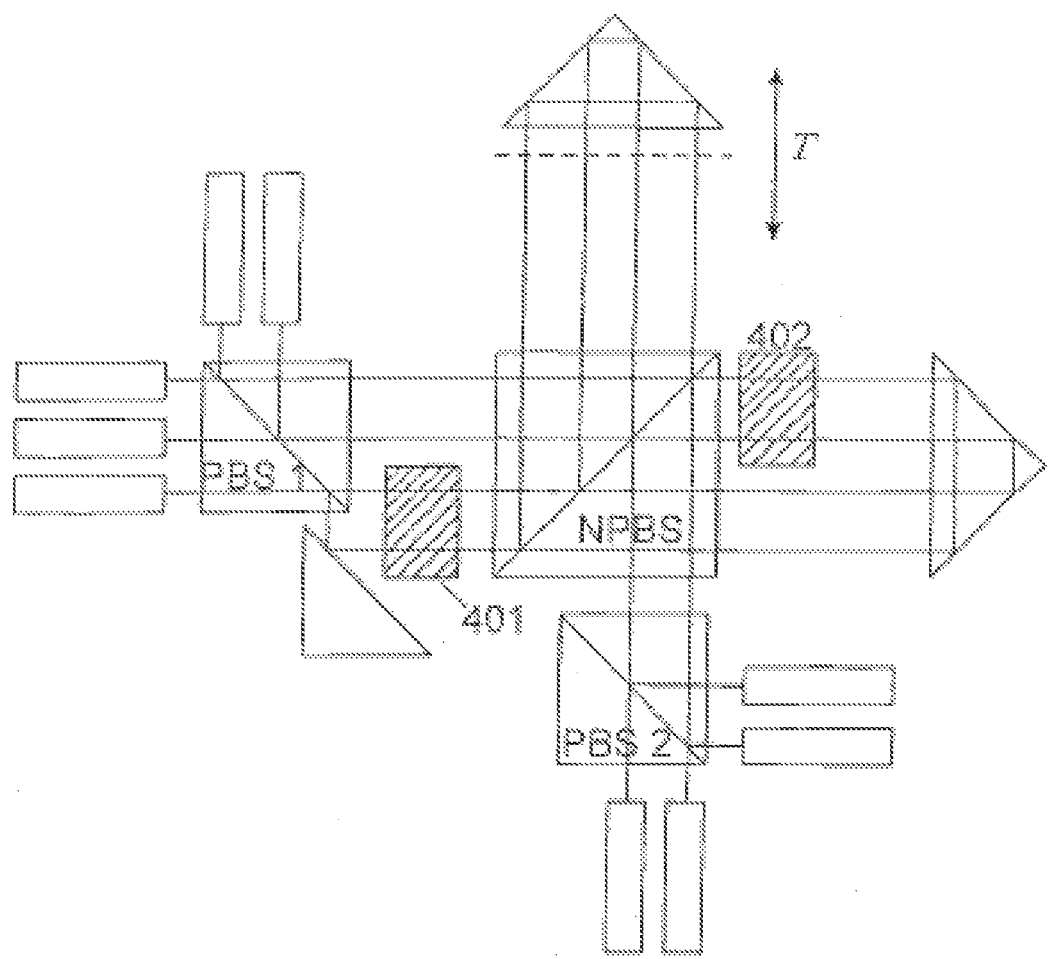
FIG. 2 is a schematic drawing of an exemplary implementation of the invention with a polarisation diversity self coherent detection.

This structure can further be simplified by letting the two orthogonal polarisation components of the incoming signals share the quarter wave plate at 45° which would then be positioned before the beams are coupled into the non-polarisation beam splitter 307 as shown in FIG. 2. Compared to the setup in FIG. 1, the two birefringent elements 309 and 310 are substituted by the single birefringent element 401, being a quarter wave plate at 45°. The birefringent element 311 is substituted by the birefringent element 402.

Modified versions with more elements in the paths and with other arrangements may be built by those skilled in the art.

By using tuneable delay and tuneable liquid crystals, the optical detector shown in FIG. 1 can be comfortably switched between the coherent and the self-coherent principle without replacing any components.

Figure 3:
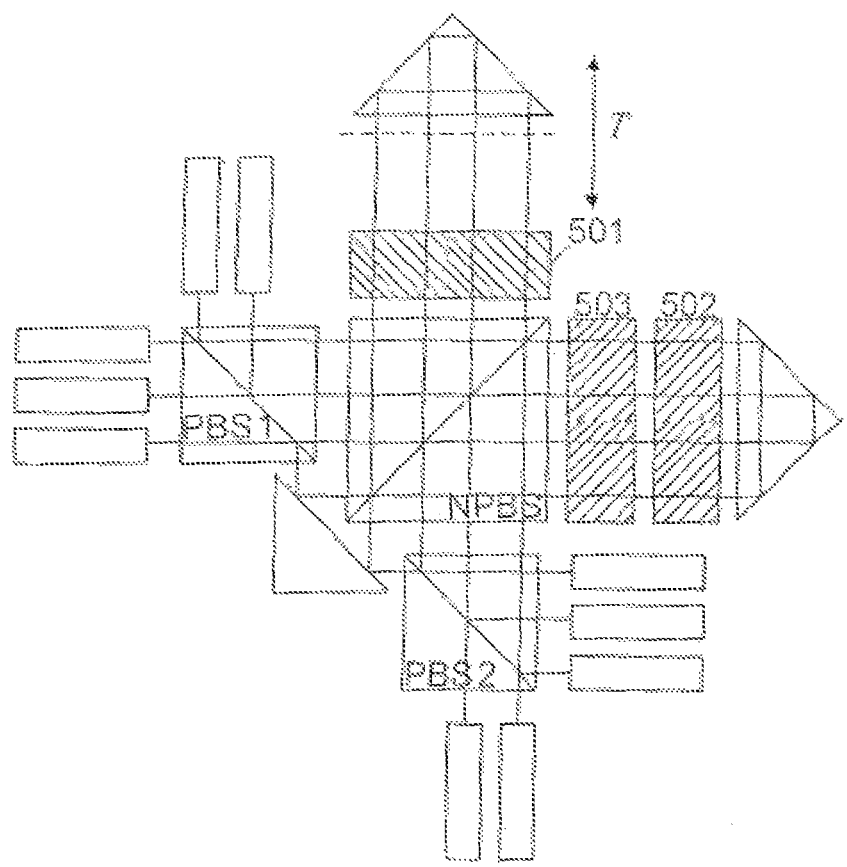
FIG. 3 is a schematic drawing of an exemplary implementation of the invention.

FIG. 3 shows an optical detector, wherein the birefringent elements are arranged differently than in the detector shown in FIG. 1. Birefringent elements 501, 502 and 503 are arranged in the paths of the light beams after passing the non-polarisation beam splitter NPBS before and after they are reflected back to the non-polarisation beam splitter. By transversing the birefringent elements 501, 502, and 503 twice on their way, the birefringent elements 501, 502 and 503 may have only the half effect as the birefringent elements 309, 310, and 311 in the detector of FIG. 1 and still result in the same effect.

Figure 4:
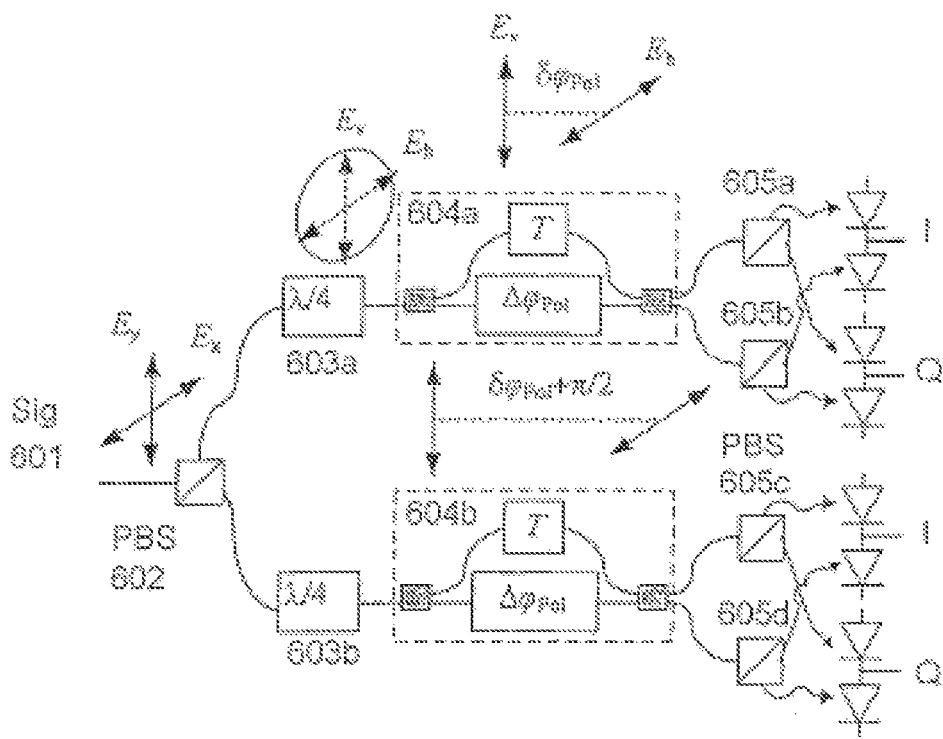
FIG. 4 is a schematic drawing of an exemplary implementation of the invention with self-coherent detection in planar lightwave circuit form.

FIG. 4 shows a planar lightwave circuit implementation of the polarisation diverse self-coherent detector as shown in FIG. 1. An optical signal 601 is split up into its two polarisations ($E_x$ and $E_y$) by a polarisation beam splitter 602. The split beams are then led into two birefringent elements 603a and 603b that are working as quarter wave plates to achieve equal power of the horizontal and vertical polarisation states ($E_h$ and $E_v$). The birefringent elements 603a and 603b can also be other birefringent elements that achieve equal power of $E_h$ and $E_v$.

Each of the signals is guided into a Mach-Zehnder delay interferometer 604a and 604b. The delay interferometer introduce a delay T onto one of the signals in the arms. The waveguides may be birefringent and induce an additional phase offset $\delta\phi_{pol}$ between $E_h$ and $E_v$.

In one or both of the arms there might be a birefringent element introducing a phase shift $\Delta\phi_{pol}$ between $E_h$ and $E_v$ which should provide a $\pi/2$ phase offset compared to the other arm, e.g. equal to $\delta\phi_{pol}+\pi/2$. Therefore the signal will interfere with its in-phase and quadrature phase delayed copy within the same beam path but with orthogonal polarisations.

The in-phase and quadrature phase components are separated at the output by the polarisation beam splitters 605a, 605b, 605c, and 605d and detected by balanced detectors. Using reflectors (not shown in FIG. 4), some of the non-polarisation beam splitters 605a, 605b, 605c, and 605d can be used twice to reduce the number of polarisation beam splitters needed for the detection.

By omitting some optical elements, the invention may serve for other applications.

Figure 5:
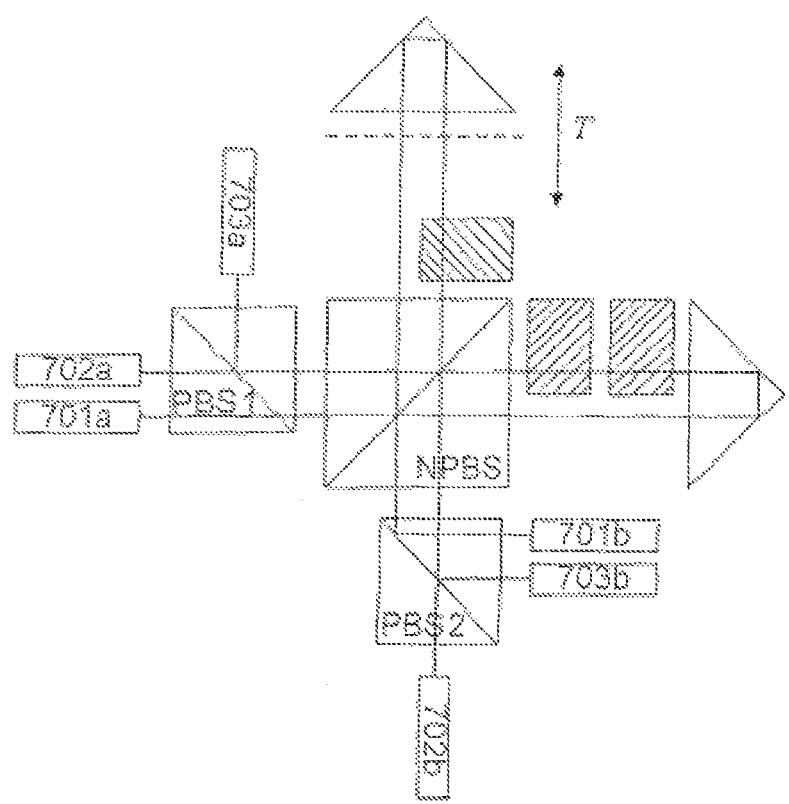
FIG. 5 is a single polarisation coherent or self-coherent or (D)QPSK differential detector.

FIG. 5 shows an optical detector for polarised light that can be used as a coherent, self-coherent or differential detector. The operation principle is analogous to the one of the detector shown in FIG. 1. However, an optical signal 701a and a local oscillator signal 701b contain polarised light. Therefore, the beams are not split during the first time they transverse the polarisation beam splitters PBS1 and PBS2, and a reflector to make the beams parallel before entering the non-polarisation beam splitter is not needed.

Figure 6:
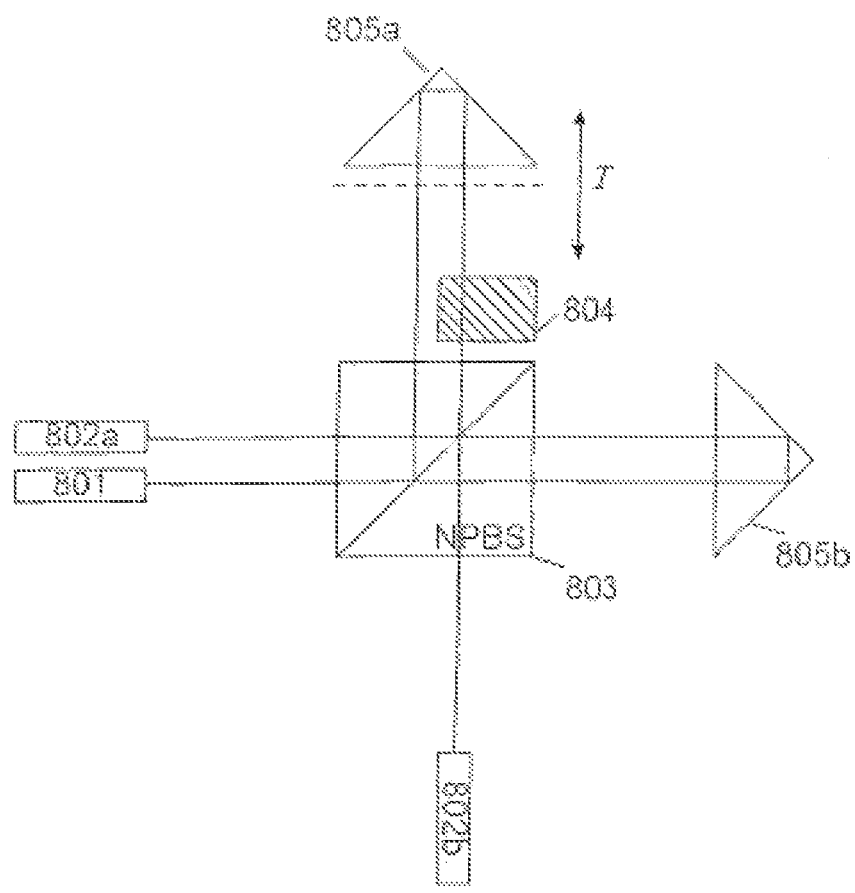
FIG. 6 is a polarisation insensitive differential binary phase shift keying (DBPSK) differential detector.

FIG. 6 shows an implementation of a polarisation insensitive DPSK detector. A birefringent element 804 is used to mitigate the birefringence within the system.

The optical detector for detecting an optical signal beam 801 comprises a non-polarisation beam splitter 803 arranged to split the optical signal beam 801 into two split optical signal beams. The birefringent element 804 providing a phase shift is arranged in a path of one split optical signal beam so that a birefringence between the two split optical signal beams is formed in output signal beams. Two detection means 802a and 802b are arranged to receive one output signal beam each that comprises a signal component of the optical signal beam 801.

Further optical elements as shown in the FIGS. 1-5 can be added as features to the optical detector shown in FIG. 6.

The versatile optical detector shown in FIG. 1 can also be used as a polarisation insensitive DPSK detector as the one shown in FIG. 6. Some of the optical elements as shown in FIG. 1 are not necessary for the detector to work as a polarisation insensitive DPSK detector.

In a production process, the same production mask as for the detector shown in FIG. 1 could be used, but omit some components, to produce an optical detector as depicted in FIG. 2-6.

Figure 7:
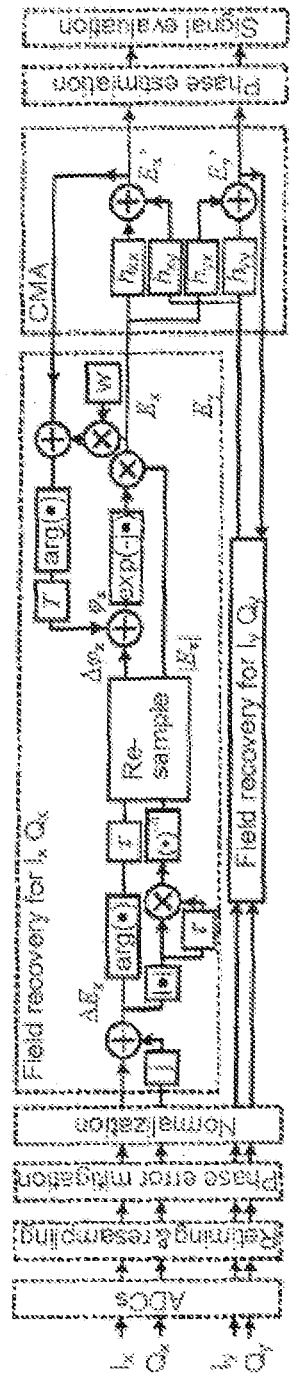
FIG. 7 is a digital signal processing flow chart for the embodiment shown in FIG. 1 implemented as a self-coherent receiver.

FIG. 7 shows a digital signal processing flow chart for the embodiment shown in FIG. 1. After digitalisation of the electrical signal components $I_x$, $Q_x$, $I_y$, and $Q_y$ a clock is extracted and the four waveforms are synchronized and re-sampled with a time delay $\tau$. Then two sources of phase errors in the delay interferometers are numerically mitigated. One is the IQ-phase imbalance within each detected polarisation, the other is the differential phase offset between the two detected polarisations. Both are static errors that can be measured in advance or estimated with the measured waveforms.

After a normalisation the differential phasor $\Delta E_{x,y}=I_{x,y}+jQ_{x,y}$ is constructed to start a field recovery. Its amplitude $|E_{x,y}(t)|\approx\sqrt[4]{|\Delta E_{x,y}(t)||\Delta E_{x,y}(t+\tau)|}$ is estimated. The estimated amplitude and the differential phase are then re-sampled to one sample per symbol. Next, the differential phase is added to a phase reference and combined with the amplitude resulting in the complex field phasor $E_{x,y}$. A butterfly CMA (constant modulus algorithm) equalizer is subsequently applied for the polarisation separation. The CMA is an iterative equalizer (finite impulse response filter) to recover the polarisation of the signal. Its structure looks like a butterfly. As the CMA is very sensitive to residual differential phase errors within the delay interferometers (which leads to increasing phase errors of $E_{x,y}$ in the field recovery), a filtered field $E_{x,y}'$ is used as a corrector for the phase reference by combining it with the recovered phase. The smaller the delay inferferometer phase error, the larger a weighting factor 'w' can be used. A phase estimation and a signal evaluation is applied as last step.

Figure 8:
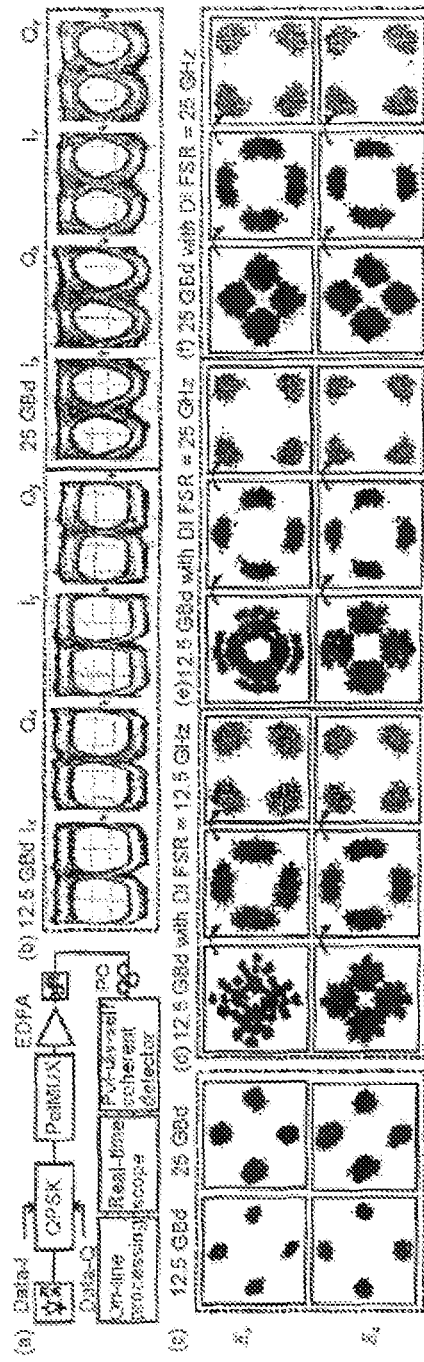
FIG. 8 is an experimental setup (a), a polarisation-resolved I/Q eye diagrams (b) and (c), and a polarisation-unaligned signal constellations (d) to (f)

FIG. 8(a) shows a PolMUX-NRZ-QPSK signal (polarisation multiplexed non-return to zero quadrature phase shift keying) generated by modulation of an external cavity laser at 1547.6 nm with two uncorrelated PRBS of length $2^{15}-1$ in a dual-MZM and a bit aligned polarisation multiplex stage with a delay of several bits. The signal is amplified and filtered before sent into a self-coherent detector applying the scheme shown in FIG. 4 with only two delay interferometers. The input signal polarisation needs only approximate adjustment to the receiver polarisation states (here by a polarisation controller (PC)) due to the CMA polarisation separation algorithm. A real time scope (50 Gb/s, 20 GHz bandwidth) is used to digitalize the waveforms for off-line processing.

Two signal baud rates are used, 12.5 GBd (50 Gb/s) and 25 GBd (100 GB/s). As a reference the receiver polarisation is aligned to the data signal, and a time delay τ to the symbol duration T.

FIG. 8(b) shows obtained eye diagrams measured with an Agilent DCA sampling oscilloscope and having a factor $Q^2 \approx 20$ dB which verifies a good quality signal generation and self-coherent reception.

Constellation diagrams of the differential phasors as shown in FIG. 8(c) are measured with real time scope and also verify a good quality reception. A stronger noise in the 25 GBd constellation is attributed to the bandwidth limitation of the real time scope.

The self-coherent receiver with non-aligned polarisations is considered only with polarisation mixing. Thus, a FIR (finite impulse response) butterfly filter length is set to 1 tap only. Larger filters could also be used, e.g. to receive signals with PMD. FIG. 8(d) to (f) show exemplary results plotting the received constellation, the constellation after polarisation recovery and the recovered field constellation after phase estimation for a 1 μs time duration.

In the experiments was found that the algorithm for polarisation separation and field recovery converges well when the signal polarisation is rotated against the PBS axes at the receiver input by <35°. Simulations show that for angle rotations >35° (up to 45°), the recovered signal's intensity increases above 30%. Therefore the use of polarisation trackers with relaxed requirements is recommended to operate the self-coherent receiver at arbitrary polarisations.

LIST OF REFERENCE NUMERALS 301a, 601, 701a, optical signal
801, 101, 201
301b, 701b, 102 local oscillator signal
302a, 302b, 303a, detection means
303b, 304a, 304b,
305a, 305b, 702a,
702b, 703a, 703b
802a, 802b
315a, 315b, 602, polarisation beam splitter
605a, 605b, 605c,
605d, 103, 104,
202
307, 803 non-polarisation beam splitter
306, 308a, 308b, reflector
805a, 805b
309, 310, 311, birefringent element
401, 402, 501,
502, 503, 603a
603b, 804
312a, 312b output port
313a x-polarisation of the optical signal 301a
313b y-polarisation of the optical signal 301a
314a x-polarisation of the local oscillator signal 301b
314b y-polarisation of the local oscillator signal 301b
604a, 604b, 203, delay interferometer
203'
105, 105" optical 90° hybrid

The invention claimed is:

1. An optical detector for detecting an optical signal beam modulated in a way that it comprises at least one of an in-phase or a quadrature component, comprising:
a polarisation beam splitter arranged to split the optical signal beam into two polarised optical signal beams;
a non-polarisation beam splitter arranged to further split each of the two polarised optical signal beams into two split polarised optical signal beams;
at least one birefringent element providing a phase shift, the birefringent element being arranged in at least one of a path of at least one polarised optical signal beam or a path of at least one split polarised optical signal beam so that an in-phase and quadrature phase offset between two split polarised optical signal beams originating from the same polarised optical signal beam is formed in output signal beams; and
at least two detection means arranged to receive at least one output signal beam that comprises at least one of an in-phase or a quadrature component of the optical signal beam,
wherein the birefringent element is a wave plate in the path of two polarised optical signal beams that share a physical path within the detector at orthogonal polarisations.

2. The optical detector according to claim 1, wherein the birefringent element is arranged to form the in-phase and quadrature offset according to a coherent, a self-coherent, or a differential detection principle.

3. The optical detector according to claim 2, further comprising adjusting means by which the phase shift of the birefringent element is adjustable to enable the optical detector to be used as either a coherent detector, a self-coherent detector, or a differential detector.

4. The optical detector according to claim 3, wherein an optical axis of the birefringent element is arranged at a fixed angle with respect to the optical axis of the polarisation beam splitter, and wherein the birefringent element is a quarter wave plate or half wave plate.

5. The optical detector according to claim 1, wherein the birefringent element is arranged in both polarised optical signal beams.

6. The optical detector according to claim 1, wherein an optical axis of the birefringent element is arranged at a fixed angle with respect to the optical axis of the polarisation beam splitter, and wherein the birefringent element is a quarter wave plate or half wave plate.

7. The optical detector according to claim 1, further comprising guiding means arranged to guide the two polarised optical signal beams parallel but spatially separated into the non-polarisation beam splitter.

8. The optical detector according to claim 7, further comprising local oscillator means to provide a local oscillator signal beam for coherent detection and a polarisation beam splitter arranged to split the local oscillator signal beam provided by the local oscillator means into two polarised local oscillator signal beams.

9. The optical detector according to claim 8, wherein the non-polarisation beam splitter is arranged to split the two polarised local oscillator signal beams, and wherein the guiding means are arranged to guide one polarised optical signal beam to the orthogonally polarised local oscillator signal beam at the non-polarisation beam splitter.

10. The optical detector according to claim 9, further comprising at least one reflector to reflect at least one split polarised optical signal beam back to the non-polarisation beam splitter.

11. The optical detector according to claim 10, further comprising delay means arranged in the path of at least one split polarised optical signal beam to create a time delay between different split polarised optical signal beams.

12. The optical detector according to claim 11, further comprising at least two output ports arranged to couple out constructive and destructive interfering beam splits and two polarisation beam splitters arranged to orthogonally split the split polarised optical signal beams coupled out by the output ports to form the output signal beams.

13. The optical detector according to claim 12, wherein at least one of the polarisation beam splitter forming the output signal beams is the same polarisation beam splitter that is arranged to split the optical signal beam.

14. The optical detector according to claim 1, further comprising local oscillator means to provide a local oscillator signal beam for coherent detection and a polarisation beam splitter arranged to split the local oscillator signal beam provided by the local oscillator means into two polarised local oscillator signal beams.

15. The optical detector according to claim 1, further comprising at least one reflector to reflect at least one split polarised optical signal beam back to the non-polarisation beam splitter.

16. The optical detector according to claim 1, further comprising delay means arranged in the path of at least one split polarised optical signal beam to create a time delay between different split polarised optical signal beams.

17. The optical detector according to claim 1, further comprising at least two output ports arranged to couple out constructive and destructive interfering beam splits and two polarisation beam splitters arranged to orthogonally split the split polarised optical signal beams coupled out by the output ports to form the output signal beams.

18. The optical detector according to claim 1, wherein the birefringent element is a wave plate in the path of two split polarised optical signal beams that share a physical path within the detector at orthogonal polarisations.

* * * * *